(12) United States Patent
Buzzi

(10) Patent No.: US 11,579,037 B2
(45) Date of Patent: Feb. 14, 2023

(54) BALANCING MACHINE AND METHOD FOR BALANCING VEHICLE WHEELS

(71) Applicant: CEMB S.P.A, Mandello del Lario (IT)

(72) Inventor: Luigi Buzzi, Abbadia Lariana (IT)

(73) Assignee: CEMB S.P.A, Mandello del Lario (IT)

( * ) Notice: Subject to any disclaimer, the term of this patent is extended or adjusted under 35 U.S.C. 154(b) by 0 days.

(21) Appl. No.: 17/237,830

(22) Filed: Apr. 22, 2021

(65) Prior Publication Data

US 2021/0333167 A1 Oct. 28, 2021

(30) Foreign Application Priority Data

Apr. 24, 2020 (IT) .................. 102020000008923

(51) Int. Cl.
*G01M 1/16* (2006.01)
*B60S 5/00* (2006.01)
*F16F 15/32* (2006.01)

(52) U.S. Cl.
CPC .................. *G01M 1/16* (2013.01); *B60S 5/00* (2013.01); *F16F 15/324* (2013.01)

(58) Field of Classification Search
CPC ............ G01M 1/00; G01M 1/14; G01M 1/16; G01M 1/26; G01M 1/22; G01M 1/225; G01M 1/326; F16F 15/00; F16F 15/32; F16F 15/324; B60S 5/00
See application file for complete search history.

(56) References Cited

U.S. PATENT DOCUMENTS

| | | |
|---|---|---|
| 6,244,108 B1 | 6/2001 | McInnes et al. |
| 6,484,574 B1 | 11/2002 | Douglas et al. |
| 2004/0114154 A1* | 6/2004 | Luetche ................. G01S 17/48 356/615 |
| 2005/0132786 A1* | 6/2005 | Cullum ................. G01M 1/326 73/146 |
| 2006/0042380 A1* | 3/2006 | Douglas ................ G01M 1/326 73/460 |
| 2015/0042787 A1* | 2/2015 | Douglas ................ G01M 1/326 348/95 |

FOREIGN PATENT DOCUMENTS

DE 19503909 8/1996

* cited by examiner

*Primary Examiner* — Son T Le
*Assistant Examiner* — Matthew W. Baca
(74) *Attorney, Agent, or Firm* — Duane Morris LLP; Gregory M. Lefkowitz

(57) ABSTRACT

A vehicle wheel balancing machine having a rotating shaft which supports a vehicle wheel, a means for supporting the rotating shaft, and force sensor means adapted to detect the imbalance forces generated during the rotation of the rotating shaft; an accelerator means accelerates the shaft and the wheel and an angular sensor means senses an angular position; an electronic means processes information obtained by the force sensor means and determines the value and the position of correction masses adapted to compensate an imbalance present on the wheel; a moving indicator means is moved by a motorized actuator means and is configured to project a light dot on the wheel; a fixed indicator means projects a luminous beam, perpendicular to the axis of rotation, or a luminous dot, having a fixed and known angle of incidence on the inner surface of the wheel; a coincidence of the moving luminous point with the fixed luminous line or dot identifies a desired position of a counterweight on the diameter of the wheel.

5 Claims, 7 Drawing Sheets

BALANCING MACHINE AND METHOD FOR BALANCING VEHICLE WHEELS

The present invention relates to a balancing machine and to a method for balancing vehicle wheels.

As is known, vehicle wheels require frequent balancing operations, for example every time the tires are changed or following an abnormal wear of the tire.

The balancing operation consists in mounting on the wheel small counterweights made of heavy material, so as to compensate the less-than-perfect distribution of the mass of the wheel with respect to its rotation axis, which by definition is the cause of imbalance.

A rotating body is in fact defined as balanced when the geometric condition of coincidence of the rotation axis with the center of gravity axis and main inertia axis is met.

The measure of the imbalance is obtained by means of an adapted balancing machine on which the wheel is made to rotate after being fixed to a precision flange, so as to reproduce the fixing that is present on the vehicle, i.e., so as to make the rotation axis of the wheel be the same one that occurs in operating conditions.

By virtue of the rotation, the centrifugal forces generated by the imbalance become manifest on the balancing machine and are measured by sensors located in the machine itself.

The machine is therefore capable of calculating the mass of the balancing counterweights which, arranged on predetermined surfaces on the wheel and in given angular positions calculated by the instruments of the balancing machine, are capable of compensating the uneven distribution of the masses on the wheel, i.e., of balancing it.

The counterweights are fixed by means of steel springs to the outside of the rims or, very frequently, with adhesive counterweights inside the rim in the axial positions defined beforehand during the size setting step.

The correction planes are defined as surfaces of the rim of the wheel that intersect planes that are perpendicular to the rotation axis, are chosen by the operator, in which it is possible to apply the counterweights once the measurement step has ended.

The planes are usually two, defined as internal plane and external plane, arranged as close as possible respectively to the inside curve and to the outside curve of the rim.

The operator chooses the ideal position of these planes, which are defined by the axial distance from the flange plane to the planes and their diameter with respect to the wheel center.

This choice is indispensable so that the measurement part of the machine can calculate correctly the value of the correction masses.

The correction angle is calculated by the balancing machine and refers to the angular position in which the counterweights must be placed on the correction planes already established.

The operation for measuring the position of the correction planes with respect to the balancing machine must be performed before the balancing of each wheel, so as to be able to determine accurately the plane on which the counterweight will have to be positioned in that type of rim.

Various more or less sophisticated measurement systems, normally integrated in the balancing machine, exist for selecting the correction planes.

The simplest measurement system includes a gauge constituted by a sliding rod and a probe.

The operation consists in resting the probe on the correction plane, using a graduated bar arranged on the rod. The operator enters the axial positions of the correction plane or planes obtained from the graduated bar as well as the diameter of the rim, in the measurement instrument. The operation must be performed for the two correction planes within the rim, in case of correction with adhesive counterweights, or only for an internal plane if the correction must occur by using spring-based counterweights.

These systems, while simple to manufacture and inexpensive, have the problem of being slow in the dimension acquisition process. Furthermore, the correctness of the entered data item is defined exclusively by the attention of the operator.

A more advanced system, always using the gauge, provides for replacing the graduated bar with sensors suitable to measure an axial distance and a radial distance, so as to have faster and more precise entry of the correction planes.

Therefore, the correctness of the entered data item does not depend on the operator and is a simpler operation; however, the system has the problem that the frequency with which mechanical problems and consequent needs for replacement of parts or calibration of the potentiometers occur increases, due to the presence of multiple more complex mechanical components.

One common problem of the systems described above is that after the measurement launch the identification of the position of the correction planes determined beforehand during calibration is entrusted to the memory of the operator, particularly in the case in which adhesive counterweights are used and the two correction plans are inside the rim.

In order to avoid counterweight mounting errors, some machines use more or less sophisticated indication systems, such as line or dot laser indicator systems, as described for example in DE19503909 and U.S. Pat. No. 6,244,108, or mechanical systems, as described for example in EP1653210.

U.S. Pat. No. 6,244,108 discloses a correction method based on a laser pointer wherein the wheel dimensions are measured with a caliper which is physically mounted on the rim: after the wheel is spun in order to measure the imbalances, the laser pointer indicates the correction point.

U.S. Pat. No. 6,484,574B1 discloses a balancer for a wheel rim/tire assembly, including a rotation sensor assembly for measuring rotation, and a motor operatively connected for rotating the wheel rim/tire assembly. The dimensions are taken with the caliper.

US2005132786A1 discloses a method of determining a type of corrective weight for application to an edge of a rim of a wheel for correcting imbalance of the wheel, including measuring dimensions of an edge of a rim of a wheel to produce measured dimensions, comparing the measured dimensions to actual dimensions of different types of rim edges, determining a type of rim edge the wheel has based upon the comparison between the measured dimensions and the stored dimensions, and indicating a type of corrective weight appropriate for application to the edge of the rim of the wheel based upon the type of rim edge determined. US2005132786A1 requires a scanning device including two lasers each of which is movable relative to a wheel by stepper motors.

As is known for example from DE19503909, some balancing machines include a dot-type laser indicator, which is installed in the machine itself and is very useful during the imbalance correction step.

By means of a motor directly connected to the laser indicator and controlled by software, at the end of the imbalance measurement step the laser pointer positions itself, indicating the exact axial position of the correction plane, allowing a simple correction and obviating any possible error on the part of the operator.

Those assistance systems for correction with laser pointer are welcome on the market, because, in addition to solving a shared problem, such as the accuracy of the imbalance correction, they are characterized by a rather simple mechanical system, which is indeed constituted by a pointer and by a software-controlled motor.

In summary, the operation of a balancing machine with a gauge, for dimension acquisition, and a laser pointer, for indicating the correction position after measurement, entails the following steps:

mounting of the wheel;
acquisition of the dimensions of the wheel manually by means of the gauge (first and second correction plane);
measurement launch of the wheel, wherein the machine calculates the imbalance values;
the wheel stops, the laser turns on and indicates the axial position of the first plane and of the second plane in order to arrange the counterweights in the most effective and precise manner.

A disadvantage of such system is that the gauge is a mechanical component which requires attention during use.

The machine requires accurate maintenance and spare parts and frequent technical support. Moreover, it is a scarcely ergonomic machine in use.

More modern systems have been introduced in recent years wherein the gauge is replaced by triangulation systems which allow to automatically perform the measurement and the identification of the correction planes, with or without the intervention of the operator, and also allow to have an optical indication of the correction planes once the imbalance measurement step has ended.

Those systems, which are very expensive, have the advantage of being mechanically more sturdy and simpler in use than the gauge, but they have the problem that, since they are based on the technology of optical triangulation, they have difficulty in acquiring the profile of some types of rim, for example black and glossy or reflective rims, which are currently very common.

In summary, the operation of a gaugeless balancing machine entails that the acquisition of the dimensions is performed automatically by a triangulator, an instrument for calculating distances which is composed of a laser pointer and by an optical system which allows to calculate the distance of the formed laser dot.

The laser component of the triangulator is used during correction in order to indicate the correction position.

The procedure includes the following steps:

mounting of the wheel;
acquisition of the dimensions of the wheel automatically with the triangulator without operator intervention;
measurement launch of the wheel, and the machine calculates the imbalance values;
the wheel stops, the laser component of the triangulator turns on and indicates the axial position of the first plane and of the second plane, in order to position the counterweights in a more effective and precise manner;
since the planes are chosen autonomously by the machine, they may not be ideally the most correct ones; in this case the operator repositions the planes, for example by means of the manual rotation of the wheel that actuates the laser to move along the axis.

The system described above has several disadvantages: the triangulator has a high cost and maintenance is onerous. Moreover, as already noted, these systems do not allow to treat all currently commercially available wheels due to the problems in reading black and glossy and mirror-finish rims.

The aim of the present invention is to provide a balancing machine and a method for the acquisition of the geometric data of motor vehicle wheels, that are capable of overcoming the drawbacks of the cited prior art.

Within the scope of this aim, a particular object of the invention is to provide a system that is capable of extending the advantages of a system that is compact and reliable, such as that of the simple laser pointer, also to the wheel dimension acquisition step, whereas currently they are used only in the imbalance correction step, developing a new technique and a new method of acquisition that allow to obviate the mechanical limitations of current gauge systems and the reading limitations and the costs of current optical triangulation systems.

A further object of the present invention is to provide a structure which, by virtue of its particular constructive characteristics, is capable of giving the greatest assurances of reliability and safety in use.

This aim and these and other objects which will become better apparent hereinafter are achieved by a vehicle wheel balancing machine and method, as claimed in the appended claims.

Further characteristics and advantages will become better apparent from the description of preferred but not exclusive embodiments of the invention, illustrated by way of non-limiting example in the accompanying drawings, wherein.

Figure 1:
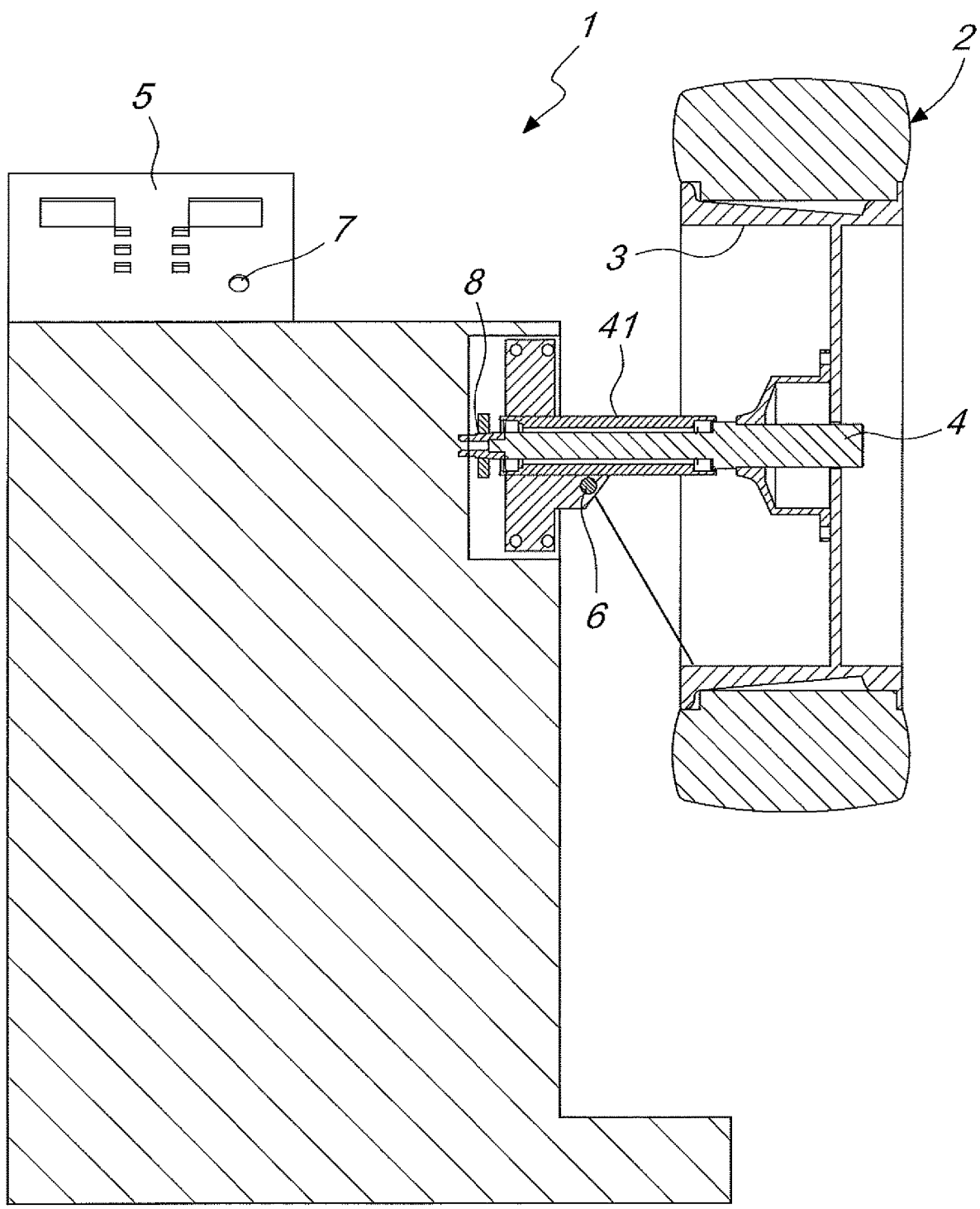
FIG. 1 is a partially sectional schematic view of a balancing machine according to the invention.

With reference to the cited figures, the balancing machine according to the invention, designated generally by the reference numeral 1, includes a precision flange 4 on which a wheel 2 which includes a rim 3 is mounted.

The wheel 2, fixed to the precision flange 4, is turned so as to reproduce the fixing that is present on the vehicle, i.e., so that the rotation axis of the wheel is the same one that can be found in operating conditions.

The precision flange 4 is mounted on a supporting structure 41.

By virtue of the rotation, the centrifugal forces generated by the imbalance become manifest and are measured by sensors located in the machine 1.

According to the present invention, the balancing machine 1 includes a laser pointer 6 mounted on the supporting structure 41.

The laser pointer 6 rotates about an axis that is perpendicular to a plane that contains the axis of the wheel 3 mounted on the shaft 8 of the balancing machine 1.

The rotation of the laser pointer 6 is provided for example by a step motor, which is not visible in the figures and is controlled by a computer 5.

When the step for mounting and locking the wheel on the shaft 8 ends, the procedure for acquiring the dimensions of the wheel 2 is started.

The procedure includes the measurement of the inside diameter of the rim 3, the axial distance of the first correction plane and, for wheels that provide for correction with adhesive weights, the axial distance of the second correction plane.

In order to acquire the diameter of the rim 3 it is possible to proceed manually, entering in the software of the computer 5 the diameter of the rim.

Once the diameter of the rim 3 has been defined, one proceeds with the acquisition of the position of the correction planes.

This operation consists in actuating the movement of the laser indicator 6 until the laser dot coincides with the axial position chosen for a correction plane, and subsequently with the position suitable for the second correction plane.

At this point, knowing the diameter of the rim and the angle to which the motor has brought the laser indicator, the axial position of the correction planes is defined.

Figure 2:
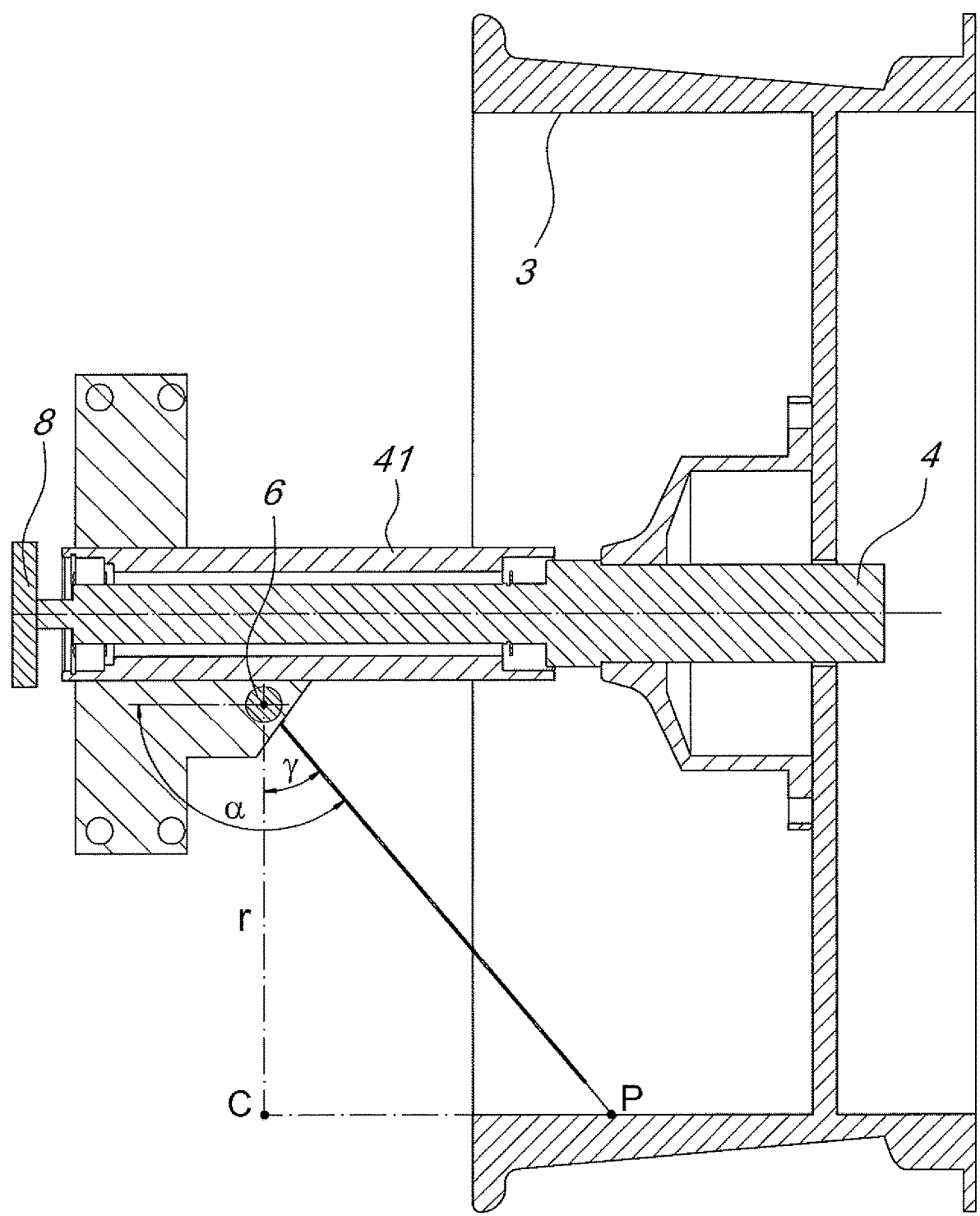
FIG. 2 is a sectional view, in enlarged scale with respect to the preceding one, of the machine according to the invention.

Assuming a laser pointer 6, the angular movement of which is measured as shown in FIG. 2, wherein α, which is known, is the angle of the laser indicator formed from the inactive position; the point P on the rim that corresponds to the position of the chosen correction plane;

γ is the angle formed by the perpendicular line that is radial to the rim and by the straight line that projects the point P;

r can be traced back by construction to the radius of the wheel, which is known;

the distance between C and P is the horizontal offset between the source of the laser pointer 6 and the point P, i.e., the axial position of the correction plane starting from a point with a known distance from the measurement system.

From simple calculations one therefore finds that:

$$CP = r \tan \gamma$$

Therefore, if the diameter of the rim 3 and the angle defined by the angular displacement of the laser indicator 6 are known, the balancing machine 1 according to the invention is capable of knowing the axial position P of the correction plane.

A simple and convenient way to control the angular movement of the motor that turns the laser pointer 6 along the internal surface of the rim 3 can be to use the rotation of the wheel 2 mounted on the balancing machine; each balancing machine has an angle sensor which measures the rotation of the shaft 8.

This is indispensable for the measurement of the position of the imbalance.

When the machine is not moving, the manual rotation of the wheel can be measured by the same angular sensor connected to the shaft of the balancing machine and, by means of the computer 5, this rotation can be used to control the laser pointer 6.

In this manner the operator can easily move the dot of light inside the rim 3 and this allows a very simple and quick positioning of the laser pointer 6 at the correction plane.

Once the laser pointer 6 has been positioned in the point chosen by the operator, confirmation for selection to the computer of the balancing machine can be performed in various manners, for example, by pressing a dedicated button 7 or by performing this confirmation by giving an impulse to the wheel 2 mounted on the shaft 8 of the balancing machine, for example a gentle bump with a fist.

This impulse is perceived by the force sensors within the balancing machine, which are already present in order to acquire the imbalance values during the imbalance measurement step.

The computer, by means of appropriate filters, is capable of receiving the signal that arrives from the force sensors and of interpreting this signal impulse as confirmation by the operator of the position of the correction plane, and of therefore storing the value of the angle or translation of the laser pointer at that given moment.

This procedure, correlated with the displacement of the laser pointer by means of the manual rotation of the wheel, allows to use as interface between the operator and the balancing machine the wheel alone, simplifying the operation and making it straightforward to understand.

As an alternative to the sensors of the balancing machine, the same function can be obtained with independent vibration sensors capable of detecting an impact.

Figure 3:
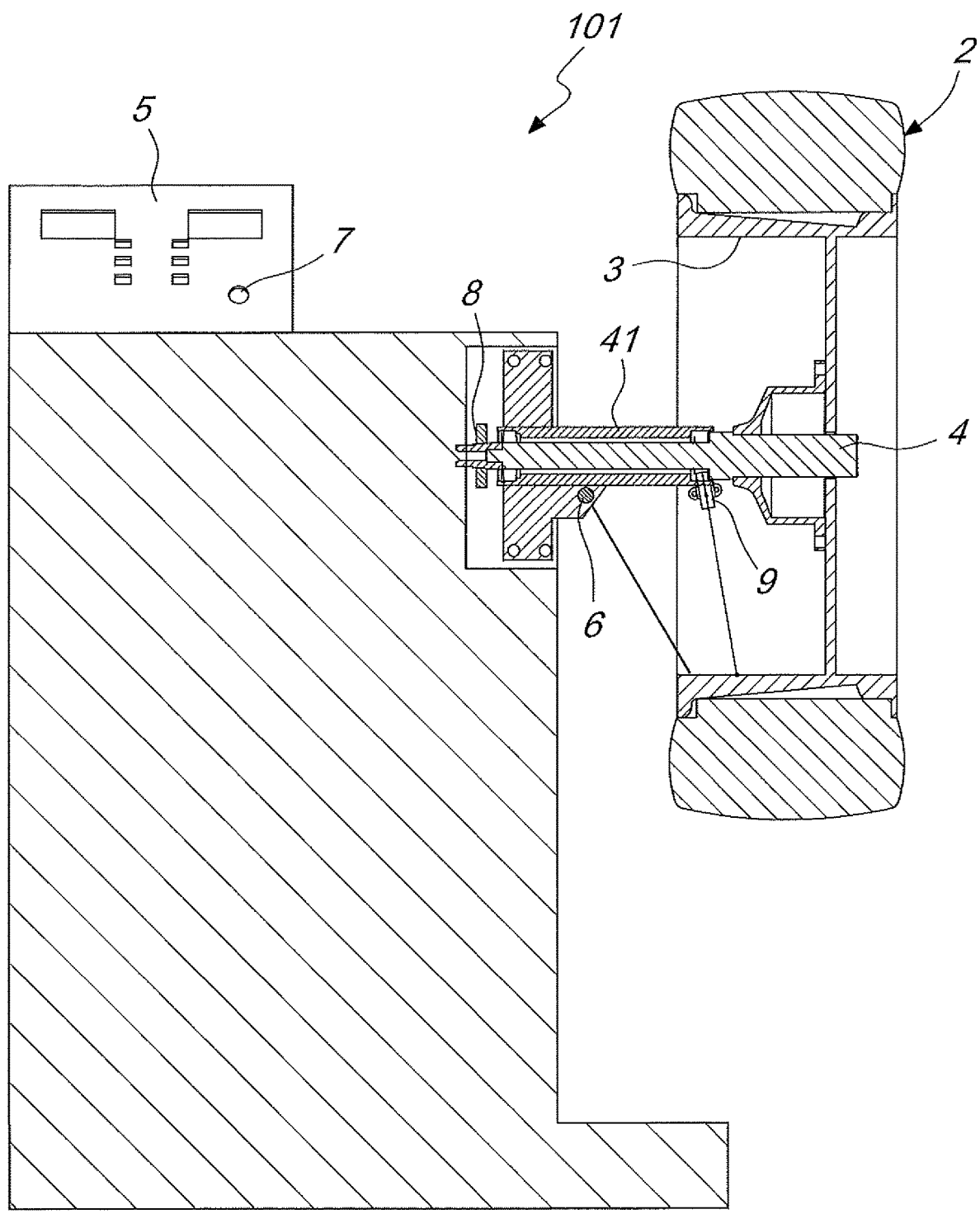
FIG. 3 is a partially sectional schematic view of a balancing machine according to a further aspect of the invention.
Figure 4:
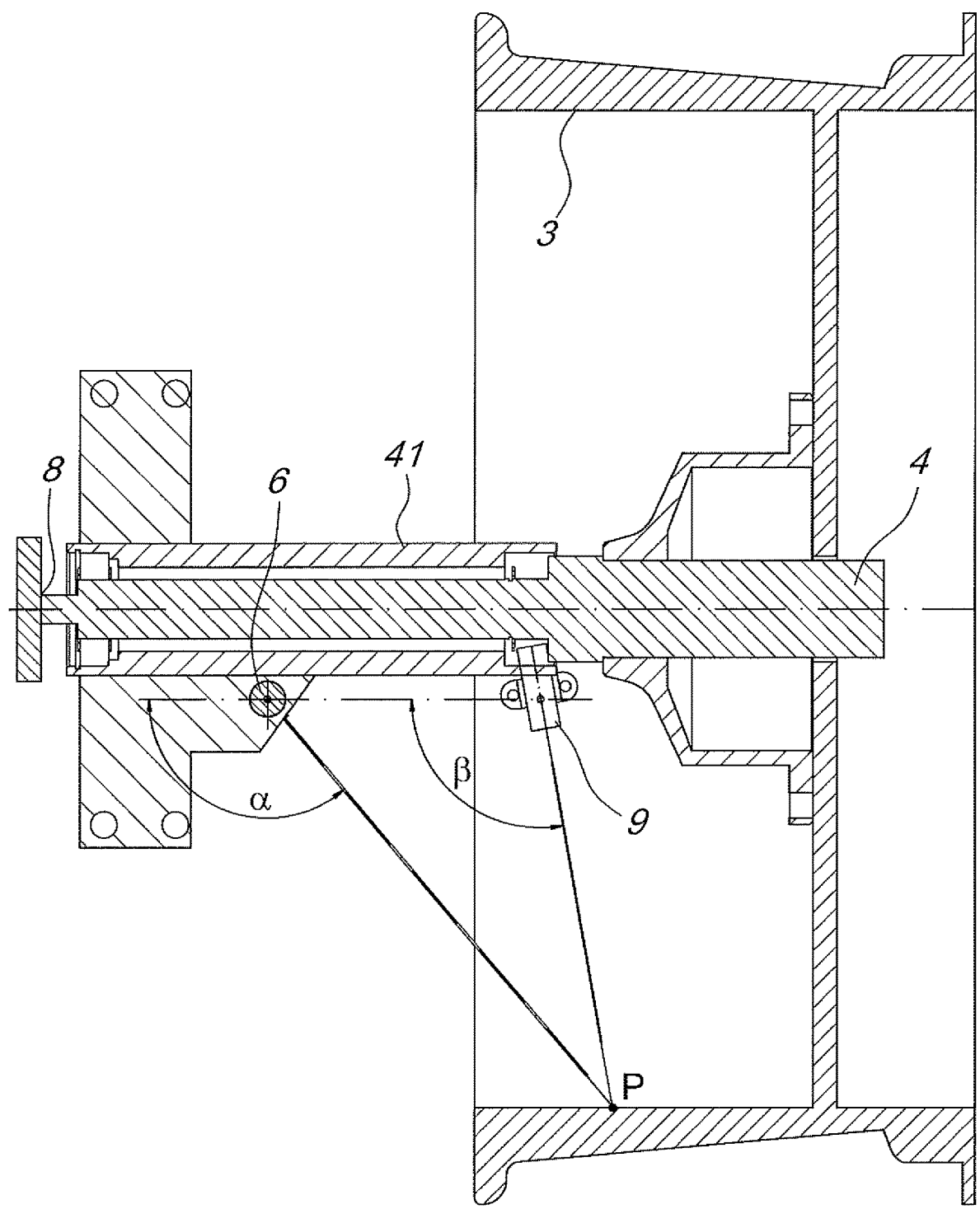
FIG. 4 is a sectional view, in enlarged scale with respect to FIG. 3, of the machine according to the invention.
Figure 5:
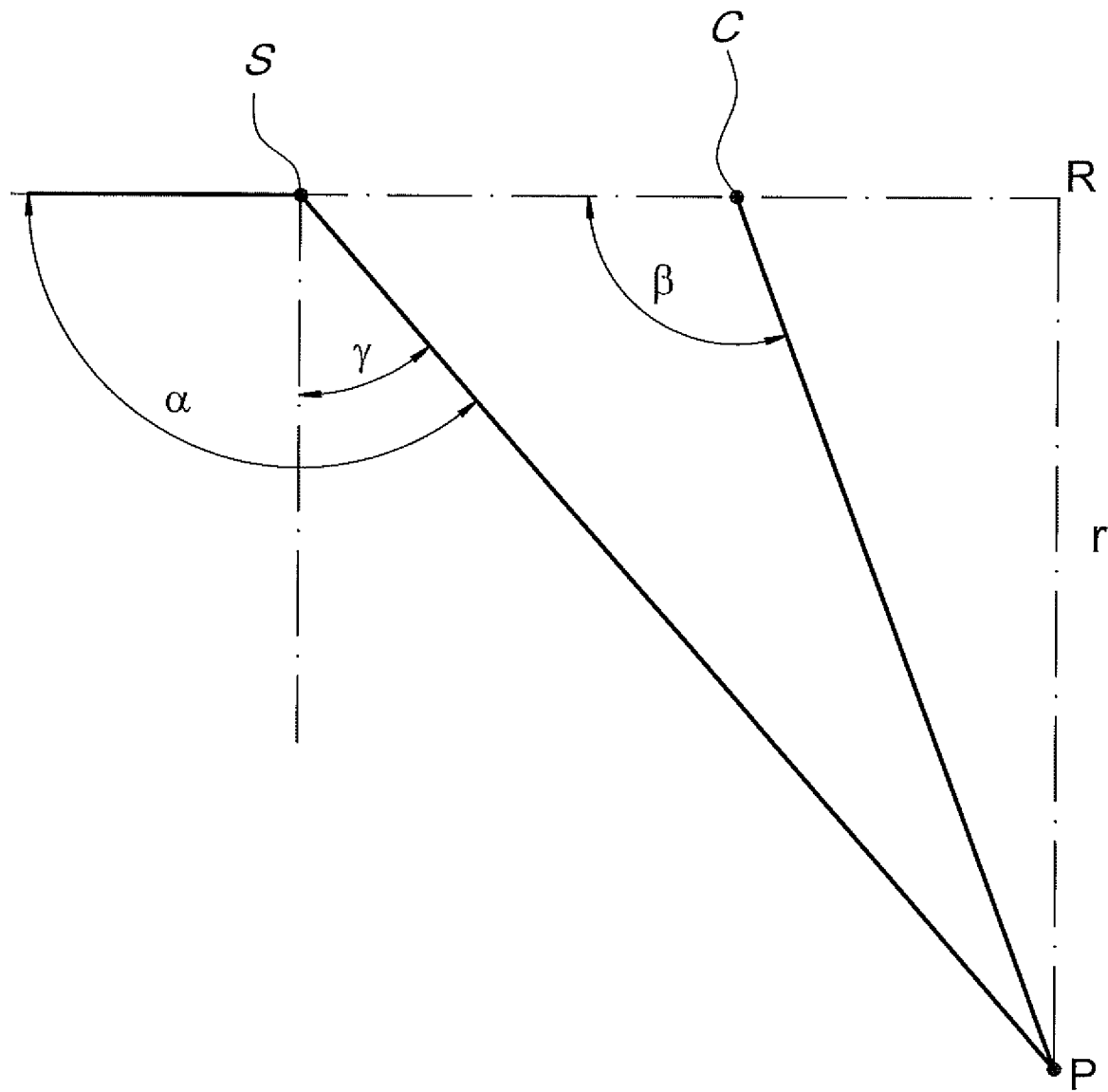
FIG. 5 is a schematic view of the trigonometric calculation system for obtaining the value of the diameter of the rim, by means of the machine of FIGS. 3 and 4.
Figure 6:
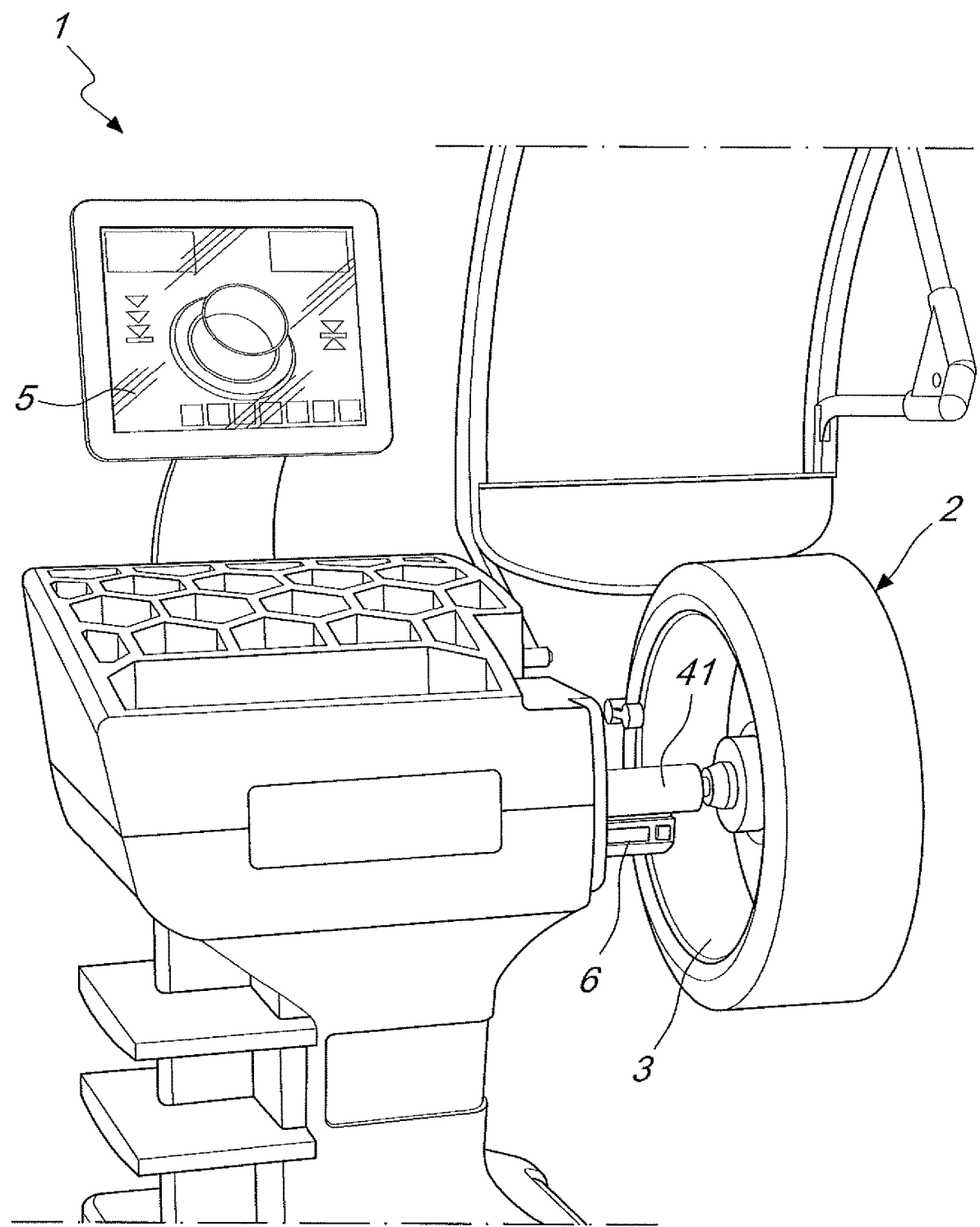
FIG. 6 is a perspective view of a constructive example of the balancing machine according to the invention.
Figure 7:
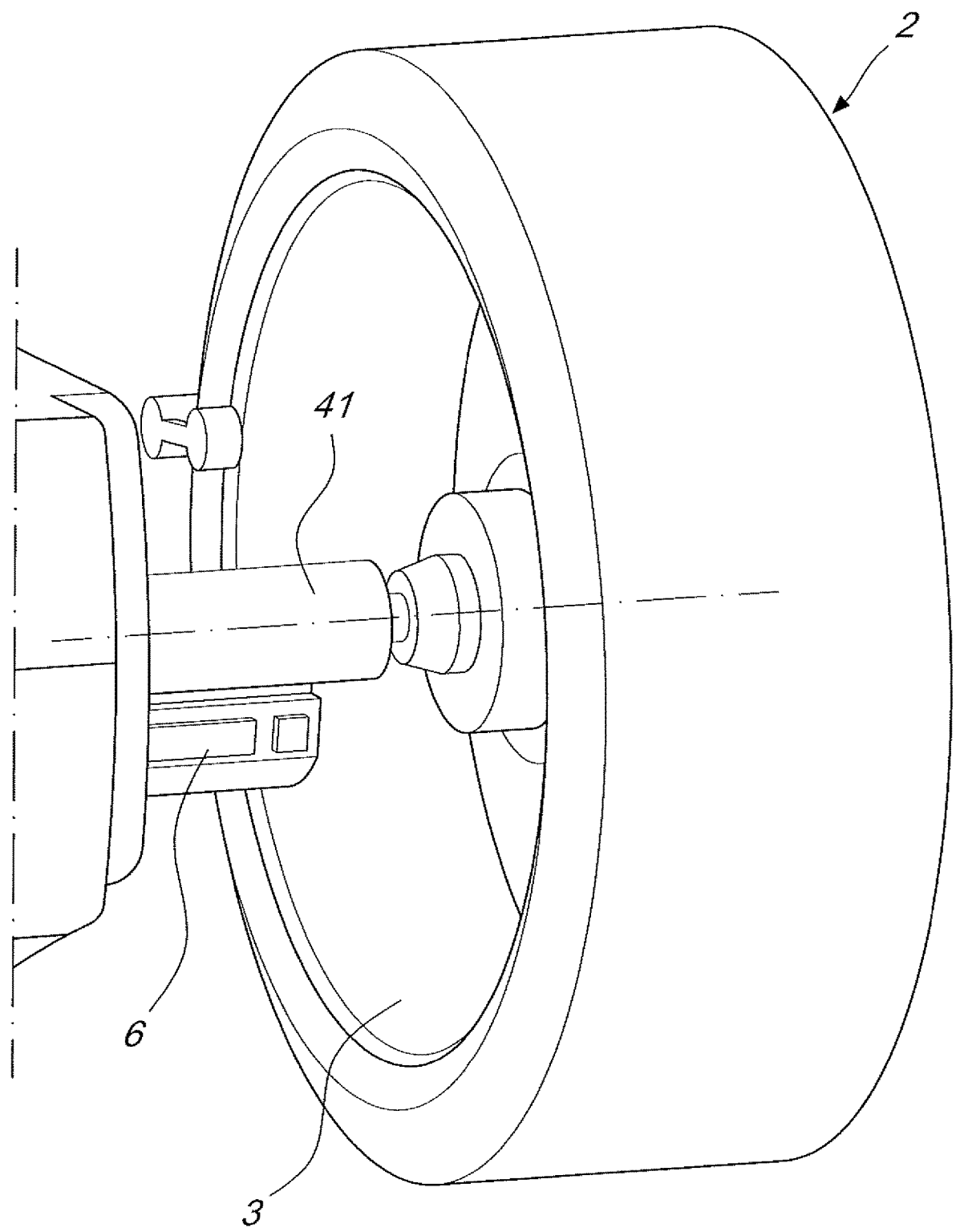
FIG. 7 is a perspective view, in enlarged scale with respect to the preceding one, of the constructive example of the balancing machine according to the invention.

FIGS. 3-5 show a constructive example of the balancing machine, designated by the reference numeral 101, according to a further aspect of the invention, wherein the same reference numerals of FIGS. 1-2 designate substantially similar elements.

One possibility to render the data setting operation more complete is a system that allows the acquisition of the diameter of the wheel 2.

Instead of proceeding manually with the entry in the software of the diameter of the rim 3 it is possible to obtain the diameter of the rim by means of a line or dot laser emitter, designated by the reference numeral 9, which can be defined as a collimator and generates a dot or a line of light on a section of the rim 3.

The angle between the luminous path generated by the collimator 9 and the shaft of the balancing machine, which is fixed and is defined mechanically, is known, and the distance between the collimator 9 and the laser pointer 6 also is known mechanically. A diagram of the solution can be seen in FIG. 3.

The method to be followed in order to obtain the value of the diameter is to make the laser dot generated by the laser indicator 6 coincide with the projection of the dot or line generated by the collimator C that corresponds to the point P (FIG. 4). For that angle measured in the rotation of the laser indicator there exists a single rim diameter value.

By means of simple trigonometric calculations it is in fact possible to obtain the value of the diameter, with particular reference to FIGS. 4 and 5:

if the following are known:

the angle α, defined as the angle formed by the laser indicator with the collimation point P;

the angle γ, defined as the angle formed by the perpendicular line that is radial to the rim and by the collimation point P;

the angle β, defined as the angle formed by the collimator with the axis of the shaft of the balancing machine, which is fixed and known by design;

the distance SC, which is fixed and known by design;

having as unknown r, a distance which can be traced back by construction to the radius of the wheel;

it is possible to obtain that:

$$SP \cos \gamma = RP = r$$

$$SP \sin \gamma = (SC + CR)$$

$$CP \cos(\beta-90°) = r$$

$$CP \sin(\beta-90°) = CR$$

By substituting one obtains r, which can be traced back to the radius of the rim:

$$\frac{SC \cot y}{1-\tan(\beta-90°)\cot y} = r$$

It is therefore possible to obtain the value of the diameter of the rim by making the laser pointer coincide with the point generated by the fixed collimator.

The procedure for moving the laser pointer is the same one that is followed during the step of acquisition of the correction planes, as described above, or can be obtained by means of the manual rotation of the wheel; likewise, confirmation on the part of the operator can be performed by giving a slight impulse to the wheel, as described above.

The complete procedure can be summarized as follows:
- mounting of the wheel on the shaft of the balancing machine;
- acquisition of the first correction plane by means of the movement of the laser pointer by means of the manual rotation of the wheel and subsequent confirmation, for example with a bump of a first on the wheel;
- manual entry of the diameter of the wheel in the software of the balancing machine, or by arranging the pointer on the dot or line produced by the collimator and subsequent confirmation, for example with a bump of a first on the wheel;
- in the case of aluminum wheels, acquisition of the second correction plane by means of the movement of the laser pointer by means of the manual rotation of the wheel and subsequent confirmation, for example with a bump of a first on the wheel;
- measurement of the imbalance;
- correction of the imbalance, in which the laser pointer indicates the points at the counterweight application position; the axial positions of these points are the same ones acquired during the calibration step, stored by the electronic systems, and repeated so that the operator is facilitated in determining the position where the counterweights are to be applied.

The balancing machine according to the present invention allows the acquisition of the dimensions by means of a laser pointer (spotter) but without the need for a gauge, acquiring the dimensions before measurement and indicating the correction position after measurement.

In summary, the procedure according to the invention includes the following steps:
- mounting of the wheel;
- acquisition of the dimensions of the wheel by means of the laser pointer;
- measurement launch of the wheel, where the machine calculates the imbalance values;
- the wheel stops, the laser turns on and indicates the axial position of the first plane and of the second plane, in order to position the counterweights in a more effective and precise manner.

An important advantage of the balancing machine according to the present invention is constituted by the fact that it includes only the laser pointer 6 and does not have a gauge.

Therefore, the machine avoids the disadvantages of machines with a gauge and avoids the use of the triangulator and the disadvantages linked to this technology.

A further advantage is constituted by the optional use of the fixed line or dot laser pointer, the collimator 9, to acquire the wheel diameter.

In practice it has been found that the invention achieves the intended aim and objects, a system having been provided which is capable of extending the advantages of a compact and reliable system, such as that of the simple laser pointer, also to the wheel dimension acquisition step, whereas until today they were used only in the imbalance correction step, developing a new technique and a new method of acquisition that allow to obviate the mechanical limitations of current systems with a gauge and the reading limitations and the costs of current optical triangulation systems.

The machine and method according to the invention offer distinct and considerable advantages over the prior art of record.

For example, while US2005/132786 discloses a scanning device that "includes two lasers each of which is movable relative to a wheel by stepper motors . . . ", according to the present invention there is no need of a "scanner device" or a scanner apparatus. The system according to the present invention includes two laser emitters, one of which is fixed, and the other that moves along the direction of the circle.

On the other hand, US2005/132786 merely suggests a method for analyzing the geometry of the edge of a rim in order to define the most suitable clip-on counterweight.

Also, while US2005/132786 provides that the dimensions of the edge of the rim of the wheel are measured using one of a laser, according to the present invention there is no need to carry out measurements of the profile of the rim edge.

Also, while US2005/132786 refers to "laser distance meters", i.e. triangulators, scanner device, according to the present invention the laser pointers are just pointers that are not ether triangulators or "laser distance meters".

Also, in the system according to the present invention, there is no need of displaying a graphical representation of a profile of the measured rim.

While U.S. Pat. No. 6,244,108 discloses a correction method based on a laser pointer wherein the wheel dimensions are measured with a caliper which is physically mounted on the rim, and, after the wheel is spun in order to measure the imbalances, the laser pointer indicates the correction point, according to the present invention the laser pointer is only used to measure the wheel dimensions but the gauge is not physically mounted on the rim.

Prior art document U.S. Pat. No. 6,484,574 specifically discloses the joint use of an automatic rotation of the wheel in the correction position and of a laser pointer that indicates the correction point. U.S. Pat. No. 6,484,574 clearly discloses to take the measurements with the caliper, defined as "automatic rim measuring component" which scans a contour. On the contrary, according to the present invention, no such device is need and no such operation has to be performed.

The present invention allows the acquisition of the dimensions through two simple laser pointers, without the need of triangulators, gauges, nor any other system that measures the dimensions.

This application claims the priority of Italian Patent Application No. 102020000008923, filed on Apr. 24, 2020, the subject matter of which is incorporated herein by reference.

The invention claimed is:

1. A vehicle wheel balancing machine, comprising a rotating shaft which supports a vehicle wheel, a means for supporting said rotating shaft, and force sensor means adapted to detect the imbalance forces generated during the rotation of said rotating shaft; said machine further comprising accelerator means adapted to accelerate said shaft and said wheel and angular sensor means for sensing an angular position; said machine further comprising an electronic means adapted to process information obtained by said force sensor means which determines the value and the position of correction masses adapted to compensate an imbalance present on said wheel; said machine further comprising at least one fixed indicator means and at least one moving indicator means; said at least one moving indicator means being moved by a motorized actuator means and being configured to project a light dot on said wheel; said at least one fixed indicator means being configured to project a luminous beam or a luminous dot, said at least one fixed indicator means having a fixed and known angle of incidence on the inner surface of said wheel, wherein said moving indicator means is configured to position said light dot such that said light dot is coincident with said luminous beam or said luminous dot, the coincidence of said light dot with said luminous beam or said luminous dot identifying the diameter of said wheel, and wherein said moving indicator means is configured to position said light dot by means of an operator rotating said wheel according to an arc of rotation, along an internal part of said wheel, coinciding with the position of said fixed luminous dot or beam and coinciding with the desired position for an application of at least one of the correction masses.

2. The machine according to claim 1, comprising an input command of a measured desired position of at least one of the correction masses is effected by pressing a button.

3. The machine according to claim 2, wherein said measured desired position of said at least one of the correction masses is set manually.

4. The machine according to claim 1, comprising an input command of a measured desired position of at least one of the correction masses is effected by impacting said wheel, said impact being perceived by means of acceleration measurement systems.

5. The machine according to claim 1, comprising an input command of a measured desired position of at least one of the correction masses is effected by impacting said machine, said impact being perceived by means of acceleration measurement systems.

* * * * *